United States Patent [19]
Doi

[11] Patent Number: 5,815,504
[45] Date of Patent: Sep. 29, 1998

[54] PDH/SDH SIGNAL PROCESSOR WITH DUAL MODE CLOCK GENERATOR

[75] Inventor: Takashi Doi, Tokyo, Japan

[73] Assignee: NEC Corporation, Japan

[21] Appl. No.: 647,689

[22] Filed: May 13, 1996

[30] Foreign Application Priority Data

May 12, 1995 [JP] Japan ................................ 7-114204

[51] Int. Cl.⁶ ..................................................... H04J 3/06
[52] U.S. Cl. ........................... 370/503; 370/518; 375/376
[58] Field of Search .................................... 370/503, 510, 370/516, 518, 535, 539, 541, 543, 545; 375/371, 375, 376

[56] References Cited

U.S. PATENT DOCUMENTS 5,471,511  11/1995  De Langhe et al. ..................... 375/376

OTHER PUBLICATIONS

M. Carbonelli et al., "Synchronization of SDH Networks: Slave Clocks Model and Stability Measures", IEEE Global Telecommunications Conference (Cat. No. 92CH3130–2), pp. 829–833, vol. 2, Feb. 1992.

P. Nowosad et al., "Phase Deviations on SDH and SDH/PDH Interface", Proceedings of the 1993 IEEE South African Symposium on Communications and Signal Processing, pp. 52–57, Sep. 1993.

S. Bregni et al., "Jitter Testing Technique and Results at VC–4 Desynchronizer Output of SDH Equipment", IEEE Instrumentation and Measurement Technology Conference (Cat. No. 94CH3424–9) pp. 1407–1410, Mar. 1994.

Primary Examiner—Melvin Marcelo
Attorney, Agent, or Firm—Ostrolenk, Faber, Gerb & Sofen, LLP

[57] ABSTRACT

A signal processor comprises a first circuit for extracting a PDH (plesiochronous digital hierarchy) signal from an incoming SDH (synchronous digital hierarchy) signal and a second circuit for adding an overhead to an incoming pure SDH signal to produce a synchronous transport module (STM) output signal. The output of the first circuit is selected when the incoming signal contains the PDH signal and the output of the second circuit is selected when the pure SDH signal is received. A local oscillator produces a first clock signal when the incoming signal contains the PDH signal or a second clock signal when the pure SDH signal is received. A read/write circuit is provided for storing the selected signal into a buffer at a first rate and reading the stored signal from the buffer at a second rate. The difference between the first and second rates is detected by a comparator. A microprocessor-controlled oscillator, which operates in a frequency synthesizer mode when the PDH signal is contained in the incoming signal or in a phase locked mode when the incoming signal is a pure SDH signal, is responsive to the difference value for generating a clock signal whose intervals are averaged during the frequency synthesizer mode and whose intervals are locked to the difference value during the phase locked mode. The output of the microprocessor-controlled oscillator is mixed with either of the first and second clock signals from the local oscillator to produce a line clock signal at which the second rate of the read/write circuit is set.

6 Claims, 2 Drawing Sheets

PDH/SDH SIGNAL PROCESSOR WITH DUAL MODE CLOCK GENERATOR

BACKGROUND OF THE INVENTION

1. Field of the Invention

The present invention relates to a dual-mode signal processors capable of processing a plesiochronous digital hierarchy (PDH) signal and a synchronous digital hierarchy (SDH) signal.

2. Description of the Related Art

A prior art signal processor has two line clock generators, one is a direct digital synthesizer and the other is a phase locked loop. The direct digital synthesizer is operated when an incoming synchronous digital hierarchy (SDH) bit stream contains a signal in which a plesiochronous digital hierarchy (PDH) signal is encapsulated. The phase locked loop is operated when the incoming signal is a pure SDH bit stream. The PDH signal is extracted from the incoming SDH bit stream and the direct digital synthesizer is synchronized to the outgoing bit rate of the extracted bit stream by compensating for the difference between the incoming bit rate and the outgoing bit rate. An overhead is added to the incoming signal if it is a pure SDH signal to produce a STM (synchronous transport module) signal. Either of the extracted PDH signal and the STM signals is delivered to a line coder where they are converted to a CMI (coded mark inversion) format for line transmission. Each of the outputs of the direct frequency synthesizer and the phase locked loop is used as a line clock of the CMI format. Since the two line clock generators do not simultaneously operate, the prior art signal processor is not cost effective.

SUMMARY OF THE INVENTION

It is therefore an object of the present invention to provide a cost-effective signal processor for PDH and SDH signals.

According to the present invention, a signal processor comprises a first circuit for extracting a PDH signal from an incoming SDH signal and a second circuit for adding an overhead to an incoming pure SDH signal to produce a synchronous transport module (STM) output signal. The output signal of the first circuit is selected when the incoming signal contains a PDH signal and the output signal of the second circuit is selected when the incoming SDH signal is a pure SDH signal. A local oscillator produces a first clock signal when the PDH signal is detected in the incoming signal and a second clock signal when the pure SDH signal is received. A read/write circuit is provided for storing the selected signal into a buffer at a first rate and reading the stored signal from the buffer at a second rate. The difference between the first and second rates is detected by a comparator. A microprocessor-controlled oscillator, which operates in a frequency synthesizer mode when the PDH signal is contained in the incoming SDH signal and in a phase locked mode when the pure SDH signal is received, is responsive to the difference produced by the comparator for generating a clock signal whose intervals are averaged during the frequency synthesizer mode and whose intervals are locked to the difference during the phase locked mode. The clock signal from the microprocessor-controlled oscillator is mixed with either of the first and second clock signals from the local oscillator to produce a line clock signal. The second rate of the read/write circuit is set according to the line clock signal.

If the incoming PDH signal has a data rate of 140 Mb/s, the first circuit converts the 140-Mb/s incoming PDH signal to an administrative unit level-4 (AU-4) signal, and if the incoming SDH signal is an AU-4 signal the second circuit adds a section overhead to the AU-4 signal to produce an STM-1 output signal. In this case; the rate of the line clock signal is twice the second rate of the read/write circuit and equals the rate of a coded mark inversion (CMI) format into which the signal read out of the buffer will be converted, and the second rate of the read/write circuit is set equal to one half of the rate of the line clock signal.

BRIEF DESCRIPTION OF THE DRAWINGS

The present invention will be described in further detail with reference to the accompanying drawings, in which.

DETAILED DESCRIPTION

Figure 1:
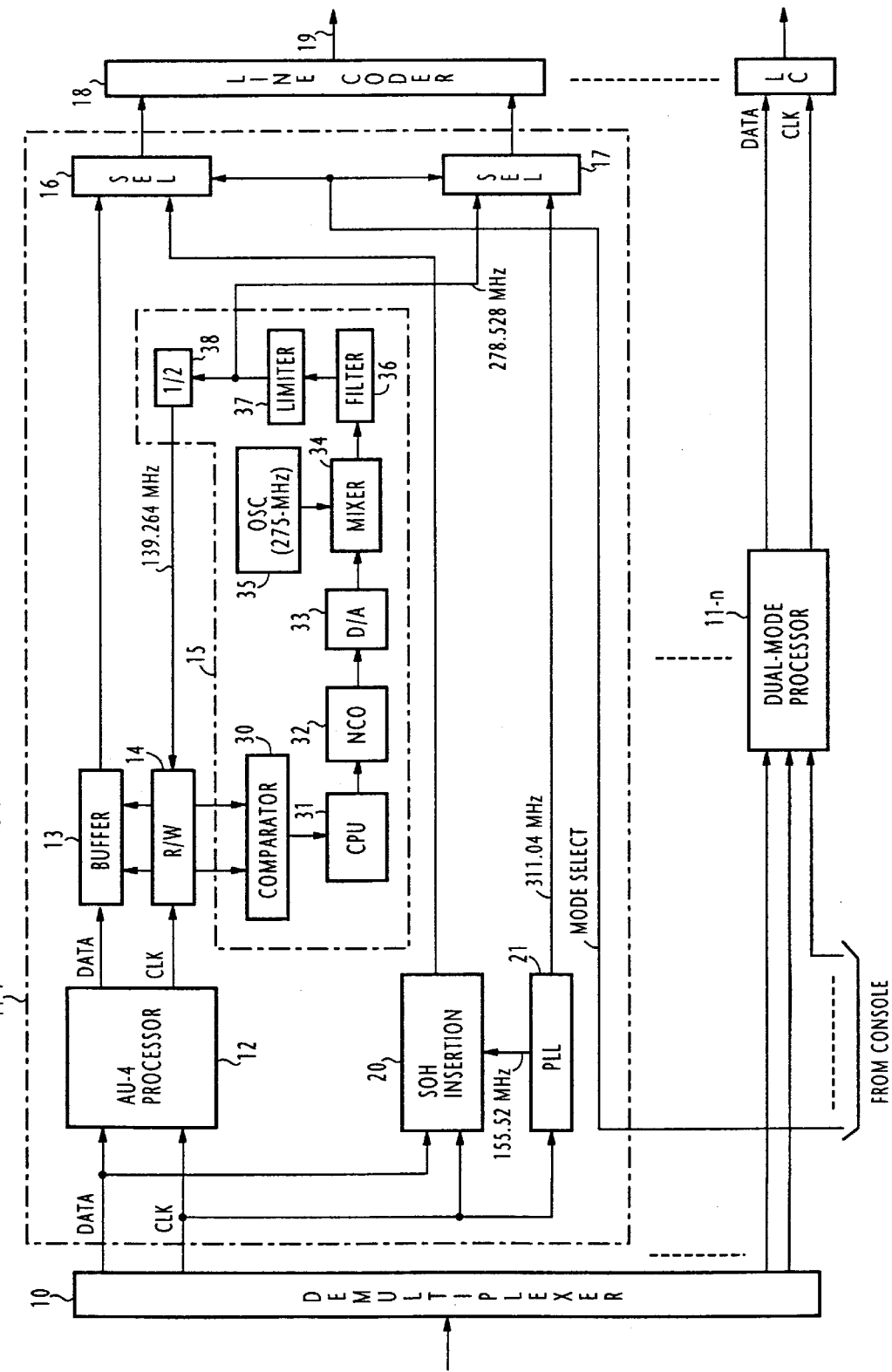
FIG. 1 is a block diagram of a prior art signal processor for handling both PDH (plesiochronous digital hierarchy) and SDH (synchronous digital hierarchy) signals.

Before proceeding with the detailed description of the present invention, it may be appropriate to provide an explanation of the prior art with reference to the block diagram shown in FIG. 1. SDH (synchronous digital hierarchy) digit streams containing PDH (plesiochronous digital hierarchy) 140 Mb/s digit streams and SDH AU-4 (administrative unit level 4) signals (pure SDH signals) are multiplexed and transmitted to the input of a demultiplexer 10 whose outputs are connected to a plurality of signal processors 11-1 through 11-n respectively implemented on printed circuit boards. An administrative unit level 4 is a data unit that is transported on a STM-1 (synchronous transport module level 1) frame and is formed by a virtual container (VC, which is known as a virtual tributary synchronous payload envelope in the North American literature) and an AU pointer which is an arithmetical value used in the SDH system to indicate at each level of digital hierarchy where the overhead of the next level begins. The administrative unit AU-4 is formed by a VC-4 and its AU pointer, and addition of a section overhead (SOH) to the AU-4 constitutes the STM-1 frame. The PDH 140-Mb/s signal is encapsulated within the AU-4 format of the SDH signal.

Each signal processor 11 includes an AU-4 processor 12, a buffer 13, a read/write circuit 14, a direct digital synthesizer 15, a data selector 16, a clock selector 17, a SOH (section overhead) insertion circuit 20, and a phase-lock loop 21. The signal processor operates in a 140-Mb/s mode or a STM-1 mode depending on the logic level of a mode select signal supplied from a control console, not shown. Demultiplexer 10 supplies data and clock signals to the AU-4 processor 12 and SOH insertion circuit 20. The data signal from the demultiplexer 10 is in a unipolar format and the output of the data selector 16 is converted to a CMI (coded mark inversion) format in a line coder 18 for transmission through a trunk 19. The line coder 18 is clocked at twice the rate of symbols supplied to it for conversion to the CMI format.

During the 140 Mb/s mode, a 140-Mb/s PDH digit stream is mapped in an AU-4 format of an incoming SDH signal from the demultiplexer 10. The PDH-containing AU-4 signal is mapped onto a table in the AU-4 processor 12 and the PDH signal is extracted and supplied to the buffer 13 whose write operation is under the control of the read/write circuit 14 according to the clock rate of the incoming PDH signal and whose read operation is controlled by a 139.264-MHz clock supplied from a divide-by-two counter 38. Thus, the PDH signal is read out of buffer 13 at the frequency of 139.264 MHz and forwarded through the data selector 16 to the line coder 18.

The amount of read clock rate that is offset from the write clock rate is detected by a comparator 38 and supplied to a CPU 31. Using the offset value, the CPU 31 controls a numeric-controlled oscillator 32 to produce a digital signal representative of frequency 3.528 MHz. This digital signal is converted to a 3.528-MHz sinusoidal wave by an analog-to-digital converter 33 and supplied to a mixer 34 where it is mixed with a 275-MHz carrier from an oscillator 35. To produce a jitter-free line clock, the CPU 31 averages the calculated intervals of clock signal. The output of mixer 34 is passed through a filter 36 and through an amplitude limiter 37 to produce a frequency 278.528 MHz which is a sum of the output frequencies of NCO 32 and oscillator 35 (i.e., 3.528 MHz and 275 MHz, respectively) and is twice the clock frequency at which the 140-Mb/s digit stream is read from the buffer 13. The 278.528-MHz output of limiter 37 is supplied to the divide-by-two counter 38 where it is halved to produce the data read clock for the read/write circuit 14. The output of limiter 37 is coupled through the clock selector 17 to the line coder 18 to supply a CMI clock rate for the 140-Mb/s data read out of buffer 13.

During the STM-1 mode, a AU-4 component of a pure SDH signal is supplied from the demultiplexer 10 to the SOH insertion circuit 20 where it is stored in a mapping memory and a section overhead is added to the stored signal. The input clock of the pure AU-4 signal from the demultiplexer 10 is applied to the phase-lock loop 21 where it is converted to a dock frequency 311.04 MHz which is supplied through the clock selector 17 to the line coder 18. Similar to the direct digital synthesizer 15, the PLL 21 includes a divide-by-two counter for halving the 311.04 MHz clock to produce a read clock at 155.52 MHz. This read clock is supplied to the insertion circuit 20 to read data from the mapping memory to produce a 155-Mb/s STM-1 frame, which is forwarded through the data selector 16 to the line coder 18. The PLL 21 compares the input clock with the 155.52-MHz clock supplied to the SOH insertion circuit for phase lock operation.

Since the use of a direct digital synthesizer and a phase-lock loop is not cost effective, the present invention provides a simplified signal processor for PDH/SDH signals.

Figure 2:
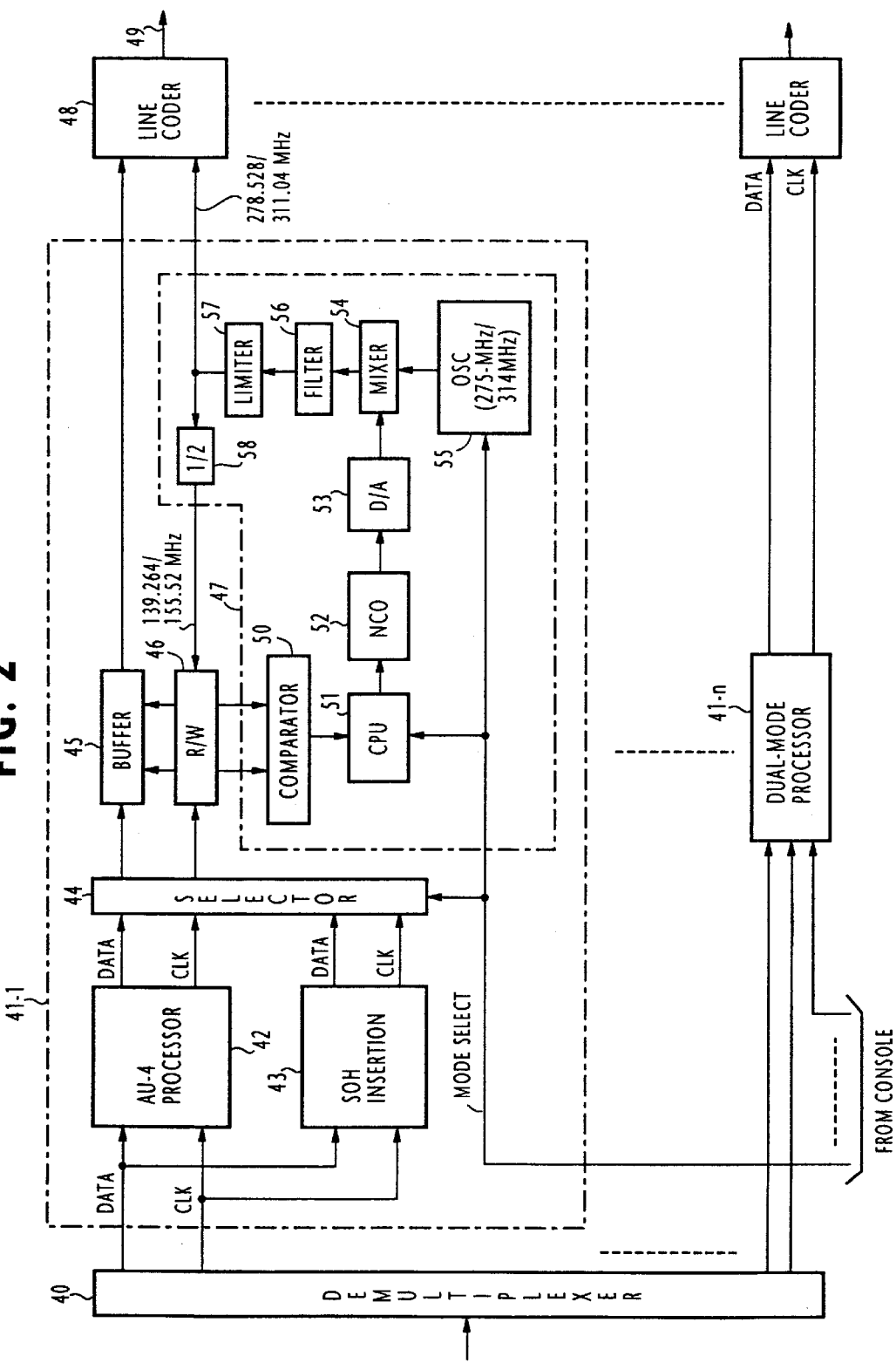
FIG. 2 is a block diagram of a signal processor of the present invention for handling both PDH and SDH signals.

Referring to FIG. 2, each dual-mode signal processor 41 of the present invention includes a data/clock selector 44 for selectively coupling the data and clock outputs of AU-4 processor 42 and those of SOH insertion circuit 43 in accordance with the logic level of the mode select signal from the control console. Selector 44 has data and clock outputs which are respectively connected to a buffer 45 and a read/write circuit 46. The read/write count outputs of the read/write circuit 46 are connected to a dual mode clock generator, or direct digital synthesizer 47. The output of buffer 45 is supplied to the data input of a line coder 48 whose output is connected to a trunk 49.

The direct digital synthesizer 47 includes a comparator 50 for comparing the read/write address values of the read/write circuit 46 and supplies an offset address to a CPU 51 in a manner similar to FIG. 1. Using the offset address, the CPU 51 controls a numeric-controlled oscillator 52 whose output is connected to a digital-to-analog converter 53. The CPU 51, NCO 52 and D/A converter 53 constitute a microprocessor-controlled oscillator. A dual-frequency oscillator 55 is provided for selectively supplying a 275-MHz carrier or a 314-MHz carrier to a mixer 54 according to the mode select signal. The mixer output is passed through filter 56 and through amplitude limiter 57 to yield a 278.528 MHz or 311.04 MHz carrier that is supplied to the clock input of line coder 48 and to a divide-by-two counter 58 where it is halved in frequency and supplied to the read/write circuit 46. The microprocessor-controlled oscillator is responsive to the mode select signal for operating in a frequency synthesizer mode when the incoming signal is a 140-Mb/s PDH digit stream is encapsulated in a SDH signal and in a phase-locked mode when the incoming signal is a pure SDH digit stream.

During the 140-Mb/s mode, the AU-4 processor 42 is selected by selector 44 to extract a 140-Mb/s PDH signal from an incoming AU-4 SDH signal and the oscillator 55 is set to 275 MHz. The PDH-containing AU-4 digit stream and its incoming clock signal are supplied to an AU-4 processor 42 where the AU-4 digit stream is mapped onto a table and the 140-Mb/s PDH signal is extracted from the AU-4 SDH format. The data and clock outputs of AU-4 processor 42 are passed through selector 44 and applied respectively to the buffer 45 and read/write circuit 46. The frequency of the output of divide-by-two counter 58 is 139.264 MHz. Using this clock rate, the read/write circuit 46 forwards data stored in buffer 45 to the line coder 48. An offset address value of the read/write circuit 46 is detected by comparator 50. The CPU 51 uses this offset value to control the NCO 52 so that the sum of the output frequencies of NCO 52 and oscillator 55 equals 278.528 MHz. After filtering and amplitude limiting at filter 56 and limiter 57, the mixer output at frequency 278.528 MHz is supplied from limiter 57 to the line coder 48 and halved to 139.264 MHz by divide-by-two counter 58 at which the read rate of the read/write circuit 46 is set. For eliminating phase jitter which would result from the difference in clock rate between the incoming PDH-containing AU-4 signal and the outgoing PDH signal, the CPU 51 operates in a normal synthesizer mode by averaging calculated dock intervals.

During the STM-1 mode, the SOH insertion circuit 43 is selected by selector 44 and the output of oscillator 55 is set to 314 MHz. An AU-4 SDH signal demultiplexer 40 is supplied to the SOH insertion circuit 43 where it is stored in a mapping memory and a section overhead is added to the stored signal so that it is converted to the STM-1 frame format. The stored frame is then delivered to the buffer 45 and the clock signal of the frame is applied to the read/write circuit 46. The frequency of the output of divide-by-two counter 58 is now 155.52 MHz. Using this clock rate, the read/write circuit 46 forwards the STM frame from buffer 45 to the line coder 48. An offset address value of the read/write circuit 46 is detected by comparator 50. Using this offset, the CPU 51 controls the NCO 52 so that the sum of the output frequencies of NCO 52 and oscillator 55 equals 311.04 MHz. After filtering and amplitude limiting, the mixer output at frequency 311.04 MHz is supplied from limiter 57 to the line coder 48 and halved in frequency by divide-by-two counter 58 to 155.52 MHz at which the read rate of the read/write circuit 46 is set. For producing the line clock for the STM frame, the CPU 51 operates in a phase-locked mode by locking the line clock frequency to the offset address value.

What is claimed is:

1. A signal processor comprising:
   a first circuit for extracting a plesiochronous digital hierarchy (PDH) signal from an incoming synchronous digital hierarchy (SDH) signal to produce a PDH output signal;
   a second circuit for adding an overhead to an incoming pure SDH-signal to produce a synchronous transport module (STM) output signal;

a selector for selecting one of the output signals of the first and second circuits;

a local oscillator for producing a first clock signal when the output signal of the first circuit is selected and a second clock signal when the output signal of the second circuit is selected;

a buffer;

read/write means for storing the selected output signal into the buffer at a first rate and reading the stored signal from the buffer at a second rate;

a comparator for detecting a difference between the first and second rate;

a microprocessor-controlled oscillator operating in a frequency synthesizer mode when the output signal of the first circuit is selected and in a phase locked mode when the output signal of the second circuit is selected, the microprocessor-controlled oscillator being responsive to said difference for producing a clock signal whose intervals are averaged during the frequency synthesizer mode and whose intervals are located to said difference during the phase locked mode; and mixer means for mixing the clock signal from the microprocessor-controlled oscillator with either of the first and second clock signals from the local oscillator to produce a line clock signal, and setting the second rate of the read/write means according to the line clock signal.

2. A signal processor as claimed in claim 1, wherein said comparator, said microprocessor controlled oscillator and said mixer means comprise a direct digital synthesizer.

3. A signal processor as claimed in claim 1, wherein the rate of said line clock signal is twice the second rate of said read/write means and equals the rate of a coded mark inversion (CMI) format of the signal read out of said buffer, said second rate of the read/write means being set at one half of the rate of said line clock signal.

4. A signal processor comprising:

a first circuit for extracting a 140-Mb/s plesiochronous digital hierarchy (PDH) signal from an incoming administrative unit level-4 (AU-4) synchronous digital hierarchy (SDH) signal to produce a PDH output signal;

a second circuit for adding an overhead to an incoming AU-4 SDH signal to produce a synchronous transport module level-1 (STM-1) output signal;

a selector for selecting one of the output signals of the first and second circuits;

a local oscillator for producing a first clock signal when the output signal of the first circuit is selected and a second clock signal when the output signal of the second circuit is selected;

a buffer;

read/write means for storing the selected output signal into the buffer at a first rate and reading the stored signal from the buffer at a second rate;

a comparator for detecting a difference between the first and second rates;

a microprocessor-controlled oscillator operating in a frequency synthesizer mode when the output signal of the first circuit is selected and in a phase locked mode when the output signal of the second circuit is selected, the microprocessor-controlled oscillator being responsive to said difference for producing a clock signal whose intervals are averaged during the frequency synthesizer mode and whose intervals are located to said difference during the phase locked mode; and mixer means for mixing the clock signal from the microprocessor-controlled oscillator with either of the first and second clock signals from the local oscillator to produce a line clock signal, and setting the second rate of the read/write means at one-half of the rate of the line clock signal.

5. A signal processor as claimed in claim 4, wherein said comparator, said microprocessor controlled oscillator and said mixer means comprise a direct digital synthesizer.

6. A dual mode clock generator for a system which selectively receives a plesiochronous digital hierarchy (PDH) signal and a synchronous digital hierarchy (SDH) signal, comprising:

a local oscillator for producing a first clock signal when the plesiochronous digital signal is received and a second clock signal when the synchronous digital signal is received;

read/write means for storing either of the received signals into a buffer at a first rate and reading the stored signal from the buffer at a second rate;

a comparator for detecting a difference between the first and second rates;

a microprocessor-controlled oscillator operating in a frequency synthesizer mode when the PDH signal is received and in a phase locked mode when the SDH signal is received, the microprocessor-controlled oscillator being responsive to said difference for producing a clock signal whose intervals are averaged during the frequency synthesizer mode and whose intervals are locked to said difference during the phase locked mode; and mixer means for mixing the clock signal from the microprocessor-controlledoscillator with either of the first and second clock signals from the local oscillator to produce a line clock signal, and setting the second rate of the read/write means according to the line clock signal.

* * * * *